(12) United States Patent
Rosenberg et al.

(10) Patent No.: US 9,084,005 B2
(45) Date of Patent: Jul. 14, 2015

(54) TWO-DIMENSIONAL BARCODE SYSTEM

(75) Inventors: Sergei Rosenberg, Irvine, CA (US); Shamir Ahituv, Jerusalem (IL); Uri Porat, Modiin (IL); Hillel Solow, Beit Shemesh (IL); Daniel Ratner, Tel Aviv (IL); Sharon Deitch, Jerusalem (IL); Yegor Gorshkov, Long Beach, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/113,149

(22) PCT Filed: Jul. 2, 2012

(86) PCT No.: PCT/IB2012/053349
§ 371 (c)(1),
(2), (4) Date: Oct. 21, 2013

(87) PCT Pub. No.: WO2013/061174
PCT Pub. Date: May 2, 2013

(65) Prior Publication Data
US 2014/0040941 A1 Feb. 6, 2014

Related U.S. Application Data

(60) Provisional application No. 61/628,206, filed on Oct. 26, 2011.

(51) Int. Cl.
*H04N 7/16* (2011.01)
*H04N 21/418* (2011.01)
(Continued)

(52) U.S. Cl.
CPC ...... *H04N 21/4181* (2013.01); *G06K 19/06037* (2013.01); *G06K 19/06112* (2013.01); *G06Q 20/32* (2013.01); *H04N 7/173* (2013.01); *H04N 21/25875* (2013.01); *H04N 21/4223* (2013.01);
(Continued)

(58) Field of Classification Search
None
See application file for complete search history.

(56) References Cited

U.S. PATENT DOCUMENTS 6,688,522 B1 *   2/2004   Philyaw et al. .......... 235/462.01
6,758,398 B1 *   7/2004   Philyaw et al. ............... 235/454
(Continued)

FOREIGN PATENT DOCUMENTS

DE   102007038810 A1   2/2009
EP       2073160 A1     6/2009
(Continued)

OTHER PUBLICATIONS

May 14, 2013 Transmittal of International Search Report and Written Opinion of the International Searching Authority for PCT/IB2012/053349.
(Continued)

*Primary Examiner* — Fernando Alcon
(74) *Attorney, Agent, or Firm* — Husch Blackwell LLP

(57) ABSTRACT

An end-user device, including a processor to prepare barcode-input data including (a) at least one of an identification of a user of the end-user device, and an identification of the end-user device, and (b) data based on activity of at least one of the end-user device, the user of the end-user device, and a security element removably inserted into the end-user device, and prepare a two-dimensional barcode including the barcode input data, the two-dimension barcode being prepared for displaying on a display in a manner suitable for scanning by a communication device. Related apparatus and methods are also included.

18 Claims, 3 Drawing Sheets

(51) Int. Cl.
*G06Q 20/32* (2012.01)
*H04N 7/173* (2011.01)
*H04N 21/4223* (2011.01)
*H04N 21/4405* (2011.01)
*H04N 21/472* (2011.01)
*G06K 19/06* (2006.01)
*H04N 21/258* (2011.01)
*H04N 21/441* (2011.01)

(52) U.S. Cl.
CPC ......... *H04N 21/441* (2013.01); *H04N 21/4405* (2013.01); *H04N 21/47211* (2013.01)

(56) References Cited

U.S. PATENT DOCUMENTS

| | | | |
|---|---|---|---|
| 7,156,292 B2 | 1/2007 | Silverbrook et al. | |
| 7,637,437 B2 | 12/2009 | Lapstun et al. | |
| 8,534,540 B2 * | 9/2013 | Gratton et al. | 235/375 |
| 8,640,956 B2 * | 2/2014 | Gomez et al. | 235/462.01 |
| D702,723 S * | 4/2014 | Abratowski et al. | D14/489 |
| 8,746,554 B2 * | 6/2014 | Gomez et al. | 235/380 |
| 8,786,410 B2 | 7/2014 | Beals et al. | 340/12.1 |
| 8,833,640 B2 * | 9/2014 | Martch et al. | 235/375 |
| 8,856,853 B2 * | 10/2014 | Casagrande et al. | 725/131 |
| 8,875,173 B2 * | 10/2014 | Kilaru et al. | 725/32 |
| 2002/0011519 A1 * | 1/2002 | Shults, III | 235/462.01 |
| 2002/0038246 A1 | 3/2002 | Nagaishi | |
| 2003/0110516 A1 * | 6/2003 | Chang et al. | 725/136 |
| 2003/0169879 A1 * | 9/2003 | Akins et al. | 380/241 |
| 2004/0043816 A1 * | 3/2004 | Gilton | 463/39 |
| 2008/0098442 A1 * | 4/2008 | Greenbaum | 725/86 |
| 2009/0001173 A1 * | 1/2009 | Sevier et al. | 235/462.41 |
| 2010/0114683 A1 | 5/2010 | Wessels et al. | |
| 2012/0096499 A1 * | 4/2012 | Dasher et al. | 725/87 |
| 2012/0130851 A1 * | 5/2012 | Minnick et al. | 705/26.8 |
| 2012/0137318 A1 * | 5/2012 | Kilaru et al. | 725/14 |
| 2012/0138671 A1 * | 6/2012 | Gaede et al. | 235/375 |
| 2012/0153015 A1 * | 6/2012 | Gomez et al. | 235/375 |
| 2012/0155838 A1 * | 6/2012 | Gerhards et al. | 386/291 |
| 2012/0159563 A1 * | 6/2012 | Gomez et al. | 725/132 |
| 2012/0206648 A1 * | 8/2012 | Casagrande et al. | 348/462 |
| 2012/0215830 A1 * | 8/2012 | Anguiano | 709/203 |
| 2012/0218471 A1 * | 8/2012 | Gratton | 348/564 |
| 2012/0222055 A1 * | 8/2012 | Schaefer et al. | 725/5 |
| 2012/0222081 A1 * | 8/2012 | Schaefer et al. | 725/132 |
| 2012/0291073 A1 * | 11/2012 | Friedman | 725/62 |
| 2013/0175333 A1 * | 7/2013 | Gilbert et al. | 235/375 |
| 2013/0334300 A1 * | 12/2013 | Evans | 235/375 |
| 2014/0079374 A1 * | 3/2014 | Gehring et al. | 386/296 |
| 2014/0173657 A1 * | 6/2014 | Afentakis | 725/40 |

FOREIGN PATENT DOCUMENTS

| | | |
|---|---|---|
| JP | 2006-246056 A | 9/2006 |
| JP | 2008-244556 | 10/2008 |
| JP | 2009-278579 A | 11/2009 |
| JP | 2011-101307 A | 5/2011 |
| KR | 2011-0005441 A | 1/2011 |
| WO | WO 03/067375 A2 | 8/2003 |
| WO | WO 2010/099551 A2 | 9/2010 |

OTHER PUBLICATIONS

"Chumby" (Wikipedia Jun. 3, 2012).
"Chumby Introduces Its New Set-Top Box, NeTV" (available at http://www.parksassociates.com/blog/article/chumby-introduces-its-new-set-top-box--netv) (Parks Associates 2012).
"Data Matrix" (Wikipedia Dec. 14, 2011).
"The ITV Doctor Is In!: Mobio CEO Clovis Najm, On Using QR Codes to Enable Interactive TV Via Companion Devices," (Available at ITVT.com/ITV_Doctor/7544/ITV-Doctor-Mobio-CEO-Clovis-Najm-UsingQR-Codes-Enable-Interactive-TV-Companion-Devi. Jan. 25, 2012).
"QR Code" (Wikipedia Jan. 25, 2012).

* cited by examiner

What is the best movie of the year?

1. HARRY POTTER
2. FANTASTIC 4 II
3. SHREK III
4. SUPERMAN III

138

126

TWO-DIMENSIONAL BARCODE SYSTEM

RELATED APPLICATION INFORMATION

The present application is a 35 USC §371 application of PCT/IB2012/053349, filed on 2 Jul. 2012 and entitled "Two-Dimensional Barcode System", which was published on 2 May 2013 is the English language with International Publication Number WO 2013/601174 and which relies for priority on U.S. Provisional Patent Application S/N 61/628,206 of Rosenberg, et al., filed 26 Oct. 2011.

FIELD OF THE INVENTION

The present invention related to preparing two dimensional barcodes.

BACKGROUND OF THE INVENTION

The following reference are believed to represent the state of the art:

An article entitle "2D code" and an article entitled "Data Matrix" in the Wikipedia website; and An article entitled "The iTV Doctor Is In!: Mobio CEO, Clovis Najm, on Using QR Codes to Enable Interactive TV via Companion Devices" at itvt.com/itv_doctor/7544/itv-doctor-mobio-ceo-clovis-najm-using-qr-codes-enable-interactive-tv-companion-devi.

SUMMARY OF THE INVENTION

The present invention, in certain embodiments thereof, seeks to provide an improved system and method for preparing two dimensional barcodes.

The system of the present invention, in embodiments thereof, aims to solve the problem of allowing users whose devices have no communication capability (such as a telephone line or an Internet connection or a wireless connection) to easily and securely deliver self-identifying information to a desired recipient.

The system of the present invention, in embodiments thereof, includes the end-user device generating a 2D barcode (for example, but not limited to, a QR code or a data matrix) to deliver self identifying information to the desired recipient using an Internet-enabled device (such as an Internet enabled phone) as an information carrier.

There is thus provided in accordance with an embodiment of the present invention, an end-user device, including a processor to prepare barcode-input data including (a) at least one of an identification of a user of the end-user device, and an identification of the end-user device, and (b) data based on activity of at least one of the end-user device, the user of the end-user device, and a security element removably inserted into the end-user device, and prepare a two-dimensional barcode including the barcode input data, the two-dimension barcode being prepared for displaying on a display in a manner suitable for scanning by a communication device.

Further in accordance with an embodiment of the present invention, the device includes a receiver to receive a data stream including video data from a Headend, the video data including at least one service, wherein the user of the end-user device is a subscriber of the at least one service, and a decoder to decode the video data of the at least one service.

Still further in accordance with an embodiment of the present invention, the device includes a smart card interface for receiving a smart card of the subscriber therein, the smart card including a smart card identification, the identification of the subscriber including the smart card identification, the smart card including the security element.

Additionally in accordance with an embodiment of the present invention the smart card is operative to compute a plurality of control words to decrypt the video data of the at least one service.

Moreover in accordance with an embodiment of the present invention the processor is operative to receive a request from the subscriber to purchase a new pay-per-view item, then check whether the subscriber is permitted to purchase the new pay-per-view item, then if the subscriber is not permitted to purchase the new pay-per-view item, prepare the barcode input data for the two-dimensional barcode to include a purchase history of pay-per-view items purchased by the subscriber, and then receive a message from the Headend allowing further pay-per-view purchases.

Further in accordance with an embodiment of the present invention the processor is operative to retrieve a pay-per-view identification of a pay-per-view item from a future entitlement control message, prepare the barcode input data for the two-dimensional barcode to include the pay-per-view identification of the pay-per-view item ordered by the subscriber, and receive an entitlement management message from the Headend authorizing viewing of the pay-per-view item.

Still further in accordance with an embodiment of the present invention the receiver is operative to receive, from the Headend, a renewal entitlement management message renewing entitlement to consume the at least one service, and then the processor is operative to prepare the barcode input data for the two-dimensional barcode to include a confirmation confirming successful receipt of the renewal entitlement management message.

Additionally in accordance with an embodiment of the present invention the processor is operative to prepare the barcode input data for the two-dimensional barcode to include a request to renew entitlement to the at least one service, and then the receiver is operative to receive, from the Headend, a renewal entitlement management message renewing entitlement to consume the at least one service.

Moreover in accordance with an embodiment of the present invention the processor is operative create the request to renew entitlement at randomly timed intervals.

Further in accordance with an embodiment of the present invention the processor is operative to prepare additional barcode input data for another two-dimensional barcode to include a confirmation confirming successful receipt of the renewal entitlement management message.

Still further in accordance with an embodiment of the present invention the identification of the user includes a public key of the user.

Additionally in accordance with an embodiment of the present invention, the device includes a chip having a chip identification, the identification of the end-user device including at least one of the chip identification and a serial number of the end-user device.

Moreover in accordance with an embodiment of the present invention the barcode input data includes an Internet address.

Further in accordance with an embodiment of the present invention the barcode input data includes a timestamp.

Still further in accordance with an embodiment of the present invention the processor is operative to prepare the two-dimensional barcode to also include a digital signature of at least part of the barcode input data.

Additionally in accordance with an embodiment of the present invention the processor is operative to encrypt at least part of the barcode input data, and prepare the two-dimensional barcode to include the encrypted barcode input data.

Moreover in accordance with an embodiment of the present invention the processor is operative to prepare the barcode input data for the two-dimensional barcode to include details of a technical problem with the end-user device or a technical problem with software running on the end-user device.

Further in accordance with an embodiment of the present invention the processor is operative to prepare the barcode input data for the two-dimensional barcode to include details of a loss of service authorizations.

Still further in accordance with an embodiment of the present invention the processor is operative to prepare the barcode input data for the two-dimensional barcode to include an item code of an item for sale.

Additionally in accordance with an embodiment of the present invention, the device includes a receiver to receive a data stream which includes an item code of an item for sale, wherein the processor is operative to prepare the barcode input data for the two-dimensional barcode to include the item code, and prepare the two-dimensional barcode to also include a digital signature of at least part of the barcode input data.

Moreover in accordance with an embodiment of the present invention the processor is operative to create the digital signature by digitally signing at least the item code and the identification of the user.

Further in accordance with an embodiment of the present invention the processor is operative to receive the digital signature signed by a smart card removably inserted into the end-user device, the digital signature authenticating the item code and the identification of the user.

Still further in accordance with an embodiment of the present invention the data stream includes an Internet address of an Internet site where the item for sale is being advertised.

Additionally in accordance with an embodiment of the present invention the processor is operative to receive a vote from the user, the vote being selected by the user from a choice of candidates, and the processor is operative to prepare the barcode input data for the two-dimensional barcode to include the vote.

There is also provided in accordance with still another embodiment of the present invention a method including preparing barcode-input data including (a) at least one of an identification of a user of an end-user device, and an identification of the end-user device, and (b) data based on activity of at least one of the end-user device, the user of the end-user device, and a security element removably inserted into the end-user device, and preparing a two-dimensional barcode including the barcode input data, the two-dimension barcode being prepared for displaying on a display in a manner suitable for scanning by a communication device.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
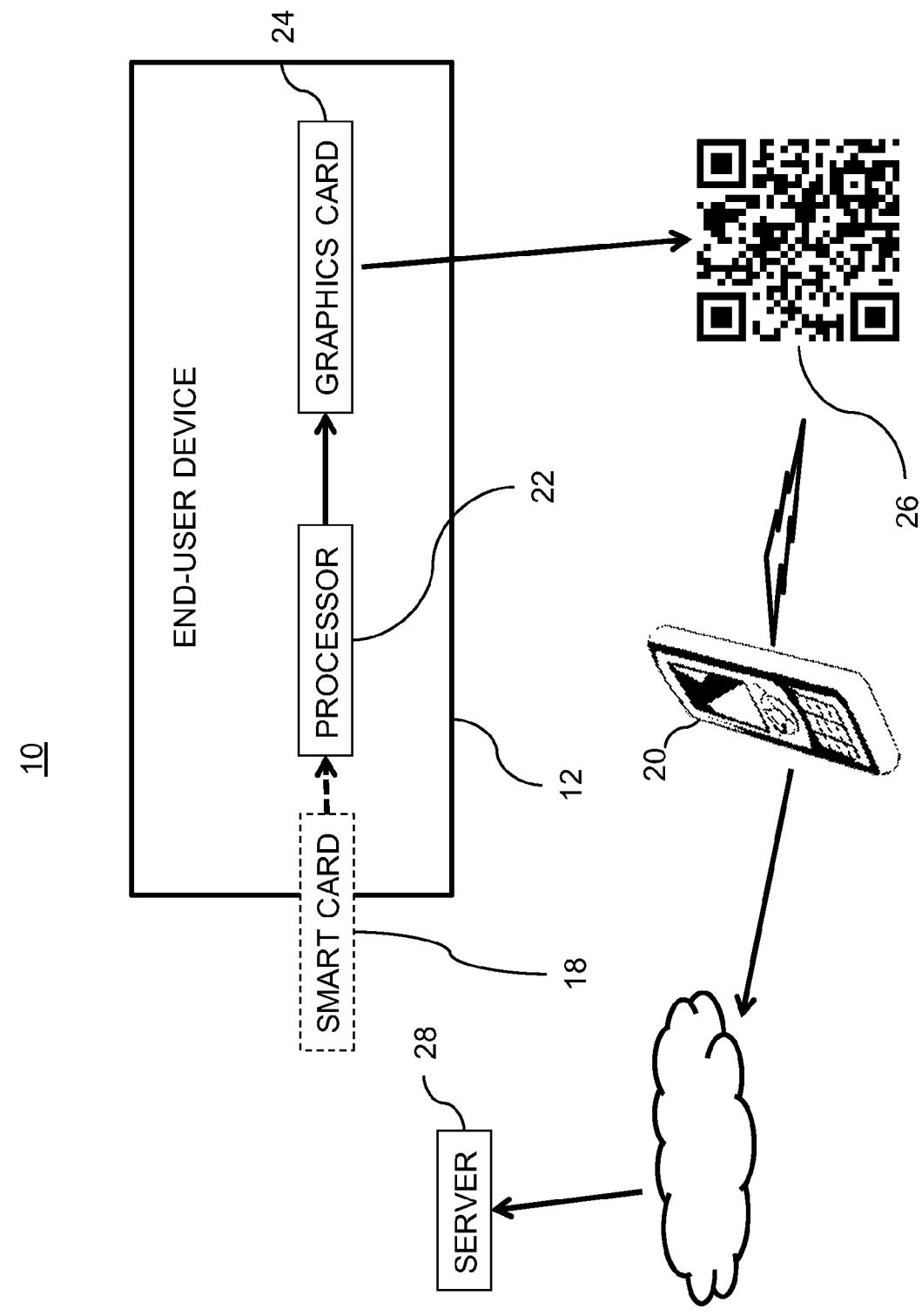
FIG. 1 is a partly pictorial, partly block diagram view of a two-dimensional barcode system constructed and operative in accordance with an embodiment of the present invention.

Reference is now made to FIG. 1, which is a partly pictorial, partly block diagram view of a two-dimensional barcode system 10 constructed and operative in accordance with an embodiment of the present invention.

The two-dimensional barcode system 10 is typically implemented in an end-user device 12. The end-user device 12 typically includes a processor 22 and a graphics card 24. The end-user device 12 may optionally include an interface for removably inserting a smart card 18 therein. The processor 22 is typically operative to prepare barcode input data and prepare a 2D barcode 26 including the barcode input data. The barcode input data typically includes data either identifying the subscriber or the end-user device 12 or both, for example, but not limited to, one or more of the following: an ID of the smart card 18; an ID of the end-user device 12 (such as a chip ID of a chip of the end-user device 12 and/or box serial number); and a public key of the subscriber which could be stored in the end-user device 12 and/or the smart card 18. The barcode input data may also include other data such as an Internet address or uniform resource locator (URL) or SMS trigger described in more detail below, a timestamp, as well as other data based on activity of the end-user device 12 and/or the subscriber and/or a security element (e.g. the smart card 18) removably inserted into the end-user device 12 depending on the use of the 2D barcode 26 (to be described in more detail below).

The data included in the 2D barcode 26 may be encrypted and/or cryptographically signed. Encryption and digitally signing the data is described in more detail below with reference to the embodiment of FIG. 2.

The graphics card 24 is operative to prepare the 2D barcode 26 for displaying on to any suitable display in a manner suitable for scanning by a communication device, for example, but not limited to, an Internet enabled device 20. The suitable display may be any suitable display, for example, but not limited to, an integrated display screen of the end-user device 12, a computer monitor, a TV screen or a projector and screen arrangement.

The Internet enabled device 20 is typically operative to run suitable 2D barcode scanning software (for example, QR code reading software) in order to scan the displayed 2D barcode 26.

The Internet enabled device 20 may be any suitable electronic device that can scan and read the 2D barcode 26 and connect to the Internet to follow the URL included in the 2D barcode 26. The Internet enabled device 20 may be a standard PC with a 2D barcode reader and suitable software or a mobile device with a camera and suitable software, by way of example only.

The Internet enabled device 20 is operative to connect to a server 28 based on the URL included in the 2D barcode 26. The Internet enabled device 20 is then operative to transfer other data included in the 2D barcode 26 to the server 28 thereby creating a path from the end-user device 12 to the server 28 thereby obviating the need for either a landline or an Internet connection directly from the end-user device 12 to the server 28.

In certain embodiments of the present invention, a non-Internet enabled communication device may be used, instead of the Internet enabled device 20, to scan and read the 2D barcode 26 and send the data included in the 2D barcode 26 to the Headend 14 or other suitable server. For example, a mobile telephone may be used to scan and read the 2D barcode 26. The barcode data may include an SMS number to which the data can be sent via SMS. As SMS messages are typically restricted to 140 bytes, the barcode data may need to be sent via a series of SMSs.

Activity of the end-user device 12, subscriber and/or security element may include any of the following: the subscriber requesting purchase of impulse pay-per-view (IPPV) content; the end-user device 12 reporting IPPV purchases; the subscriber ordering an order-ahead pay-per-view (OPPV) content item; technical data reporting to customer support based on activity of the end-user device 12; automated technical support based on a status and/or problem with the end-user device 12 or software running on the end-user device 12; secure voting selected by the subscriber; shopping requests from the subscriber; poll voting from the subscriber; lotteries entered by the subscriber; audience measurement activity; entitlement renewals request by the end-user device 12 and acknowledgement of service renewal receipt; application for installers to report installation parameters to the Headend 14; social networking integration; and medical measurement reporting. The above activities are described in more detail with reference to the embodiment of FIG. 2.

The end-user device 12 may be a set-top box (as described in more detail with reference to the embodiment of FIG. 2), a general purpose computer or a medical measuring device. For example, the end-user device 12 may take medical measurements such as blood pressure and/or glucose level and include the medical readings in the 2D barcode 26 for displaying, scanning and sending to a medical professional via the Internet enabled device 20.

Figure 2:
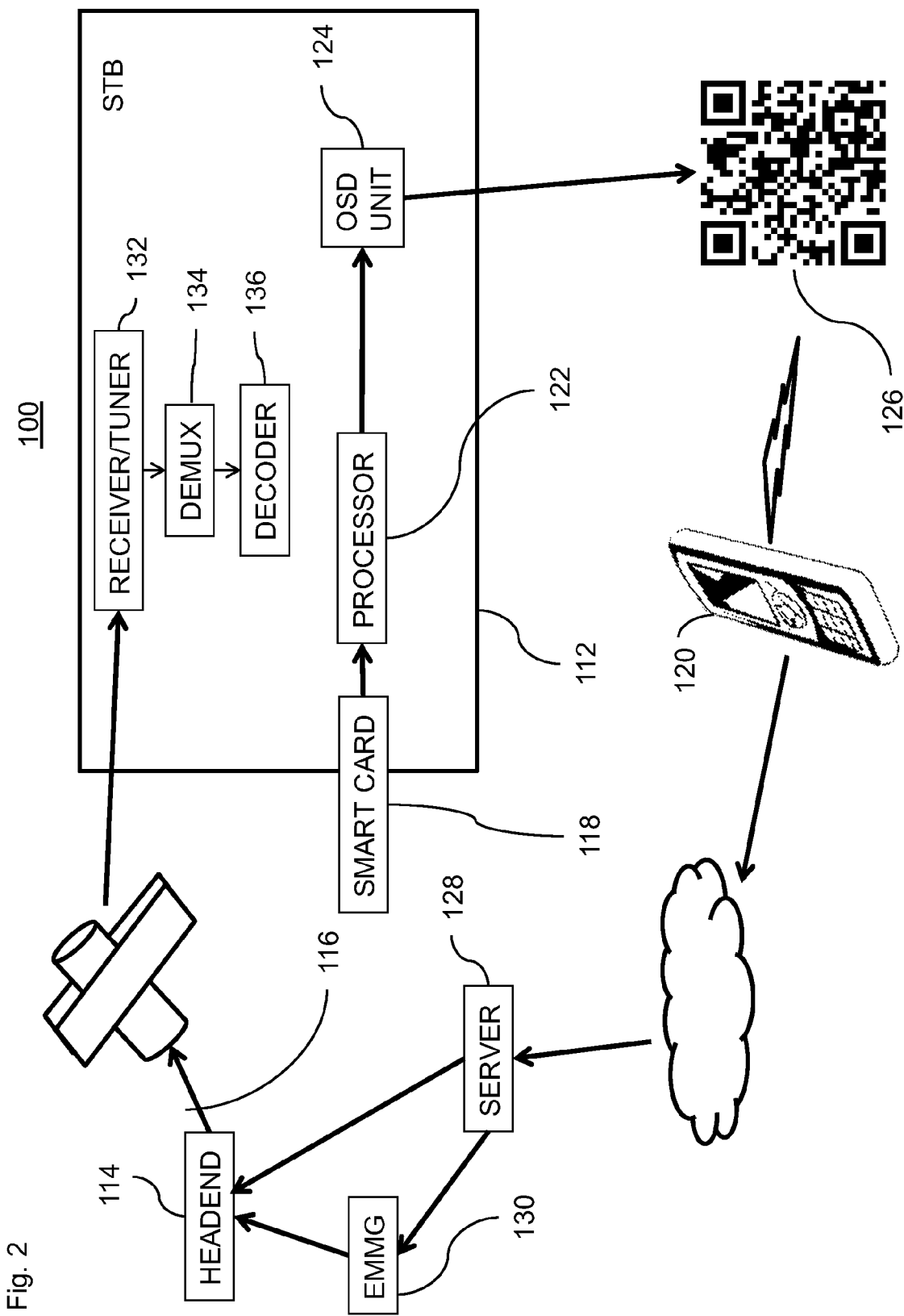
FIG. 2 is a partly pictorial, partly block diagram view of a two-dimensional barcode system constructed and operative in accordance with an alternative embodiment of the present invention.

FIG. 2 describes an embodiment where the end-user device 12 is embodied as a set-top box 112 as will now be described in more detail below.

Reference is now made to FIG. 2, which is a partly pictorial, partly block diagram view of a two-dimensional barcode system 100 constructed and operative in accordance with an embodiment of the present invention.

The system 100 typically includes a plurality of set-top boxes (STBs) 112 to receive broadcast data streams 116 from a Headend 114. Each broadcast stream 116 typically includes video and audio data of at least one service as well as metadata and program guide information. Pay per view items may also be included in the broadcast streams 116. The respective user of each STB 112 is a subscriber of at least one of the services included in the broadcast streams 116.

Each STB 112 typically includes one or more receivers/tuners 132, demultiplexers 134 and decoders 136 as well as other standard software and hardware. Each receiver/tuner 132 is operative to receive one of the broadcast data streams 116 from the Headend 114. Each demultiplexer 134 is operative to filter a service from a tuned broadcast stream 116. Each decoder 136 is typically operative to decode the audio/video data of a service filtered by one of the demultiplexers 134.

The video and/or audio data included in the broadcast streams 116 is typically cryptographically secured. The security may involve the use of entitlement control messages (ECMs) and entitlement management messages (EMMs) as is known to those ordinarily skilled in the art. Each STB 112 typically includes a smart card interface to receive a smart card 118 issued to the subscriber of that STB 112 to manage the EMMs and compute a plurality of control words to decrypt the video data of the received and filtered service as is known to those ordinarily skilled in the art. The smart card 118 typically includes a security element and a smart card identification.

Each set-top box 112 typically includes a processor 122 and an OSD unit 124. The processor 122 is typically operative to prepare barcode input data and prepare a 2D barcode 126 including the barcode input data. The barcode input data typically includes data either identifying the subscriber or the STB 112 or both, for example, but not limited to, one or more of the following: an ID of the smart card 118; an ID of the set-top box 112 (such as a chip ID of a chip of the STB 112 and/or box serial number); and a public key of the subscriber which could be stored in the set-top box 112 and/or the smart card 118. The barcode input data may also include other data such as an Internet address or uniform resource locator (URL), a timestamp, as well as other data based on activity of the STB 112 and/or the subscriber and/or a security element (e.g. the smart card 118) removably inserted into the STB 112 depending on the use of the 2D barcode 126 (to be described in more detail below).

Activity of the STB 112, subscriber and/or security element may include IPPV purchasing, IPPV reporting, OPPV ordering, technical data reporting to customer support, automated technical support, secure voting, shopping, polls, lotteries, audience measurement, entitlement renewals request/receipt, application for installers to report installation parameters to the Headend 114 and social networking integration.

The data included in the 2D barcode 126 may be encrypted and/or cryptographically signed as will be described in more detail below.

The OSD unit 124 is operative to prepare the 2D barcode 126 for displaying on to any suitable display for example, but not limited to, a TV screen or a projector and screen arrangement, in a manner suitable for scanning by a communication device, for example, but not limited to, an Internet enabled device 120.

The Internet enabled device 120 loaded with suitable software (for example QR code reading software) may be used to scan the displayed 2D barcode 126.

The Internet enabled device 120 may be any suitable electronic device that can scan and read the 2D barcode 126 and connect to the Internet to follow the URL included in the 2D barcode 126. The Internet enabled device 120 may be a standard PC with a 2D barcode reader and suitable software or a mobile device with a camera and suitable software, by way of example only.

The Internet enabled device 120 is operative to connect to the Headend 114 or a server associated with the Headend 114 or any other suitable server based on the URL included in the 2D barcode 126. The Internet enabled device 120 is then operative to transfer other data included in the 2D barcode 126 to the Headend 114 or the server associated with the Headend 114 or any other suitable server thereby obviating the need for either a landline or an Internet connection directly from the set-top box 112 to the Headend 114 or server.

In certain embodiments of the present invention, a non-Internet enabled communication device may be used, instead of the Internet enabled device 120, to scan and read the 2D barcode 126 and send the data included in the 2D barcode 126 to the Headend 114 or other suitable server. For example, a mobile telephone may be used to scan and read the 2D barcode 126. The barcode data may include an SMS number to which the data can sent via SMS. As SMS messages are typically restricted to 140 bytes, the barcode data may need to be sent via a series of SMSs.

Non-repudiation

In order to prevent resubmitting the same request at a later time, a time stamp could be included in the barcode input data. In the case of a lottery described in more detail below, using a timestamp could be imperative depending on the design of the lottery system.

How Authentication of the Sent Message is Provided

In many applications the data sent from the STB 112 must be verified to ensure that the data was indeed generated by that STB 112 and not by somebody else posing as the subscriber. Identity verification is possible by digitally signing the sent data using a secure device, for example, but not limited to, the smart card 118 or a secure element in the set-top box 112. It is assumed that only the person who physically possesses the smart card 118 and/or STB 112 (as applicable) can generate a correct signature. In this way, the operator/broadcaster can be sure that the response was in fact generated by the owner of the STB 112 (or the person in possession of the STB 112 or the smart card 118) and not by somebody posing as the subscriber. A signature may be generated using any suitable technique, for example, but not limited to, hashing the message to be sent and a timestamp and sending the hash to the smart card 118 as a Challenge-Handshake Authentication Protocol (CHAP) audit challenge. The smart card 118 returns a CHAP response which will be sent along with the message to the Headend 114 or server. Therefore, the processor 122 of the set-top box 112 is operative to prepare the 2D barcode 126 to also include a digital signature of at least part of the barcode input data, if required.

Privacy and Confidentiality

For cases when the operator/broadcaster wishes to keep the content of transferred data visible only by the operator/broadcaster (e.g.: voting data, poll data, like/unlike Facebook voting), at least part of the barcode input data can be encrypted by the processor 122 with the public key of the Headend 114 prior to preparing the 2D barcode 126. The public key need not be secure and can be stored in the STB 112 itself. The Headend 114 uses a corresponding private key to decrypt the message.

Similarly, the 2D barcode 126 may use any other suitable encryption technique (for example using symmetric key encryption/decryption) to secure the information being sent to the Headend 114, thereby reducing the likelihood that the information can be hacked. Keys stored in the smart card 118 may be used for this purpose.

As the STB ID or the smart card ID, or both, is part of the encoded payload of the 2D barcode 126 and the data of the 2D barcode 126 is generally secured by a digital signature and/or encryption, subscribers do not generally have to pre-register a scanning device 120 in order to use the two-dimensional barcode system 100.

Aspect Ratio 2D barcode standards generally require that the displayed aspect ratio (DAR) be 1:1 for the 2D barcode 126 as stretching the 2D barcode 126 in any one direction may prevent the 2D barcode 126 from being read correctly. If the customer uses a display device with analog output (component, composite, or S-Video), then the DAR cannot be assured. Displaying an image with 14:9 aspect seems to be sufficient for the current scanner technology (however, this does not fit within the ISO standard requirements) for both 4:3 and 16:9 aspect ratios. If the customer uses a high definition multimedia interface (HDMI), the problem can be solved, as the STB 112 can obtain the DAR directly from the display device and adjust display of the 2D barcode 126 accordingly.

Possible Applications

Possible applications include but are not limited to the following (each application is discussed in greater depth below):

IPPV reporting/OPPV ordering;
Service renewals;
Technical data reporting to customer support;
Automated technical support;
Secure voting/shopping/polls/lotteries/audience measurement;
Application for installers to report installation parameters to the Headend 114; and
Social networking integration.

Impulse Pay-per View (IPPV) Reporting

An important application of the two-dimensional barcode system 100 is for the smart card 118 to instruct the STB 112 to enter into a mode where IPPV purchases are not allowed (due to IPPV usage not being reported) until the 2D barcode 126 has been scanned by the Internet enabled device 120 and the response in the form of one or more EMMs from the Headend 114 is received, which clears the IPPV purchase problem. This forces subscribers to report their IPPV usage in order to continue to purchase IPPVs.

In the set-top box 112, the processor 122 is typically operative to receive a request from the subscriber to purchase a new pay-per-view item. Then, the processor 122 is operative to check whether the subscriber is permitted to purchase the new pay-per-view item. Then, if the subscriber is not permitted to purchase the new pay-per-view item, the processor 122 is operative to prepare the barcode input data for the two-dimensional barcode 126 to include a purchase history of pay-per-view items purchased by the subscriber as well as an ID of the subscriber (e.g.: the ID of the smart card 118). Once the purchase history has been sent to the Headend 114 (via scanning the 2D barcode 126 with the Internet enabled device 120), the Headend 114 prepares the service authorizations and sends them to the set-top box 112 in a message. The processor 122 in the set-top box 112 is operative to receive the message from the Headend 114 allowing further pay-per-view purchases.

The IPPV usage scenario is now described in more detail.

The subscriber attempts to purchase an IPPV, but the smart card 118 reports a problem (for example, no credit remaining in the smart card 118 or IPPVs were not reported in a timely fashion), meaning that IPPV purchase history must be reported to the Headend 114 before further purchases can be made.

The STB 112 user interface (UI) offers the subscriber the option of reporting the IPPV purchase history via a 2D barcode 126. The subscriber agrees.

The STB 112 application reads the IPPV purchase data including the smart card ID from the smart card 118. The STB 112 application then encodes the IPPV purchase information, along with the operator/broadcaster's URL, into the 2D barcode 126 and displays it on the television screen. The subscriber scans the 2D barcode 126 using the internet enabled scanning device 120. The IPPV purchase data included in the 2D barcode 126 is automatically sent to a Web server 128 specified in the URL included in the 2D barcode 126 generated by the STB 112. Communication between the internet enabled scanning device 120 and the Web server 128 is typically based on appropriate Internet protocols, for example, but not limited to, HTTP and Common Gateway Interface (CGI). The server 128 is connected to the operator/broadcaster's conditional access (CA) Headend 114.

Upon receiving the data, the Web server 128 typically directs the device 120 to a "Thank you" page. The Web server 128 then forwards the encrypted and signed packet containing the IPPV purchase information to an entitlement management message (EMM) generator (EMMG) 130. The EMMG 130 processes the "callback data" and sends the response to the STB 112 over the air (cable or satellite) as immediate EMM(s).

The EMMG 130 then finishes processing the callback information (for example, the EMMG 130 sends the data to the billing system, updates the subscription database etc).

The EMMG 130 can also send an urgent email (broadcast mail) to the STB 112 as a confirmation via the broadcast stream.

It should be noted that IPPV data or any other viewing data or user profile data may be sent to the Headend 114 or to any other suitable server when any 2D barcode 126 is created in any of the scenarios described herein (as appropriate). Therefore, the 2D barcode 126 may be used for audience measurement purposes.

Similarly, all the 2D barcodes 126 described herein may include one or more of the following: either an ID of the set-top box 112 or the subscriber; an Internet address or URL or SMS number; a timecode; a digital signature of part or all of the barcode input data. Similarly, at least part of the barcode input data of any of the 2D barcodes 126 described herein may be encrypted.

OPPV Ordering

Until now, order-ahead pay-per-view (OPPV) has been ordered by the subscriber calling the telephone number provided on the display screen, and then choosing which program they want to watch from an automated menu. However, the 2D barcode 126 can be used instead. The electronic program guide (EPG) can retrieve the OPPV ID from a linked future entitlement control message (FECM), and then encode the FECM, along with the subscriber's identification (STB 112 or card ID, or both) into the 2D barcode 126. The subscriber simply scans the code 126 with the device 120, and the request is sent to the Conditional Access (CA) Headend 114 by way of the Web server 128. The CA Headend 114 sends an OPPV authorization EMM back to the STB 112.

Therefore, the processor 122 of the set-top box 112 is typically operative to retrieve a pay-per-view identification of a pay-per-view item (e.g. OPPV item) from a future entitlement control message. The processor 122 is operative to prepare the barcode input data for the two-dimensional barcode 126 to include the pay-per-view identification of the pay-per-view item ordered by the subscriber along with the subscriber's identification. The displayed 2D barcode 126 is scanned and sent to the Headend 114 which sends the OPPV authorization to the set-top box 112. The processor 122 is operative to receive the entitlement management message from the Headend 114 authorizing viewing of the pay-per-view item.

Service Renewals

Services are typically purchased for a configurable number of days (for example 30 days), and periodically the services are automatically renewed for example, every 30 days). Service entitlements are typically conveyed in EMMs. In newer STBs equipped with power-saving features, renewal EMMs cannot be received while the box is in stand-by mode, thus increasing the chance that renewal EMMs are not received on time. The 2D barcode 126 can be utilized for service renewals in different ways explained in more detail below.

In order to make sure that services do not expire in the STB 112, renewal EMMs are sent well in advance of the expiration date of the services. Additionally, the expiry dates of the services can be extended to allow more time for EMM renewals to be sent. For example, for services which expire after 60 days (extended from 30 days), the renewal EMMs may be sent out 40 days before the services are due to expire. A certain number of days prior to the expiration date, the processor 122 of the set-top box 112 is operative to prepare barcode input data for a two-dimensional barcode 126 to include a request to renew entitlement to at least one service. The processor 122 then prepares the 2D barcode 126 for the subscriber to scan. The 2D barcode 126 typically includes an identification of the subscriber and/or the STB 112 as well as a request to send renewal EMMs for the service(s) which is going to expire. The scanned data will then be sent as a renewal request to the Headend 114, which will then send the renewal EMMs to the STB 112 and/or the smart card. Then, the receiver 132 of the set-top box 112 is operative to receive, from the Headend 114, the renewal entitlement management message(s) renewing entitlement to consume the service(s).

Additionally or alternatively, at randomly times intervals (random or pseudo-random) during the month, the processor 122 of the set-top box 112 is operative to create the request to renew entitlement in order to spread the processing time of the Headend 114 and the required bandwidth over a larger time period for all subscribers.

As STBs that do not call back have no way of indicating to the Headend 114 that the renewal EMMs were received, the renewal EMMs are typically cycled for a certain number of days, thereby using a great deal of bandwidth of the operator/broadcaster. Therefore, after the renewal EMM(s) is received, the processor 122 of the set-top box 112 is operative to prepare barcode input data for a two-dimensional barcode 126 to include a confirmation confirming successful receipt of the renewal entitlement management message as well as an identification of the subscriber and/or the STB 112. The processor 122 of the STB 112 prepares the 2D barcode 126 and the OSD unit 124 presents the 2D barcode 126 for the subscriber to scan. On receipt of the barcode input data, the Headend 114 can stop cycling the received EMM(s), thus reducing bandwidth usage.

Technical Data Reporting to Customer Support

One of the more common reasons for subscribers to call the operator/broadcaster is to deal with a technical problem. These calls often require the subscriber to provide information to the support representative, and it can be time-consuming and frustrating for both parties. A typically scenario has involved the user reading a long error message and/or error number from the screen and relaying it to the technical support personal or typing it into a telephone keypad. Using this new technology, the processor 122 of the STB 112 is operative to generate the 2D barcode 126 containing all the required details about the technical problem with the set-top box 112 or a technical problem with software running on the set-top box 112 as well as the STB ID and/or smart card ID or any other suitable ID in order to identify the STB 112. The subscriber would then only have to scan the code 126 for the support representative to receive all the information from the Internet enabled device 120 via the Internet. This will save time and reduce the possibility of human error, saving money and increasing customer satisfaction.

Automated Problem Resolution

In cases such as loss of service authorizations or a need to report IPPV purchases, the 2D barcode 126 could be automatically prepared by the processor 122 (when the situation warrants it) including the STB ID and/or smart card ID or any other suitable ID in order to identify the STB 112 and/or the subscriber as well as details of the problem (e.g. details of loss of service authorizations). The subscriber would simply scan the code 126, and the problem would be solved immediately with no further effort on the part of the subscriber (such as dealing with interactive voice response (IVR) or waiting for a customer-service representative). As in the previous scenario, this saves time, money, and increases customer satisfaction.

Secure Shopping

A customer can order goods online from data provided by the STB 112, for example, but not limited to, in a designated shopping channel or via advertisements or promotions. The broadcast data stream 116 received from the Headend 114 includes metadata which includes an item code of an item for sale (sellable product) of the currently promoted product. In this case, "goods" can be an actual purchasable product, such as a pizza, or a request for a catalog, or a video asset sold by the operator/broadcaster (a PPV, a service package, or subscription upgrade, for example).

The STB 112 can take the product code and the card ID and sign the information using the smart card 118 (or using a secure element in the set-top box 112) and include all the information including the digital signature in the 2D barcode 126 for scanning with the device 120.

In particular, the processor 122 is operative to prepare the barcode input data for the two-dimensional barcode 126 to include the item code and an identification of the subscriber. The processor 122 or smart card 118 is typically operative to prepare a digital signature by digitally signing at least the item code and the identification of the subscriber thereby authenticating the item code and the identification of the subscriber. The processor 122 is also operative to prepare the 2D barcode 126 to also include the digital signature. The security of this method is directly dependent on the security of the smartcard or similar security element. Based on the card ID, the Headend 114 can match the order with the account associated with the smart card 118. There's no practical way to make an unauthorized transaction without having customer's smartcard (or STB 112) in physical possession.

Digital music purchases can be completed immediately (using the customer's account as a money source); rights for the purchased music can be added immediately (or the title can be authorized for download from the Internet—immediately).

If the purchase request to the seller is routed through the operator/broadcaster, the operator/broadcaster has information (such as item ID, customer ID, customer name, address, etc.) to populate the customer's profile and/or to gather statistics for marketing purposes.

A 2D barcode 126 may also be provided for a specific item currently being advertised in order to provide additional information about the item to the subscriber via the Internet and/or to allow the subscriber to order the item via the Internet. The Internet address (URL) of an Internet site advertising the item can be stored as part of the metadata included in the broadcast stream 116 that is coordinated with the video content of the advertisement of the item. The URL can be encoded in the 2D barcode 126 by the processor 122 and displayed at the user's request (pressing a button on the remote control). The web browser on the scanning device 120 opens the relevant page where the item is being advertised.

Additionally, the URL of the movie, television show, or application can be embedded in the metadata included in the broadcast stream 116. The STB 112 generates the 2D barcode 126 and displays it on the screen of the display device at the user's request.

Secure Voting or Polls

Figure 3:
FIG. 3 is a view of a voting screen for use in the system of FIG. 2.

Reference is now made to FIG. 3.

Secure voting personalized with user credentials such as smart card ID and/or STB ID can be implemented via the 2D barcode 126, for example, voting for a contestant on a reality show. The selected item and the user credentials are included in a 2D barcode 126 for scanning by the device 120.

A vote is selected by the subscriber from a choice of candidate items 138 or people typically using a selection device such as a remote control. Therefore, the processor 122 is typically operative to receive the vote from the subscriber. The processor 122 is operative to prepare the barcode input data for the 2D barcode 126 to include the vote and an ID of the subscriber and/or the set-top box 112. The barcode input data included in the 2D barcode 126 may optionally be signed using a digital signature.

It should be noted that in all the embodiments mentioned herein the barcode input data may be signed with a digital signature and/or be encrypted.

Secure Lottery

For lottery systems the 2D barcode 126 typically also includes a timecode and the lottery date including the timecode is digitally signed.

Social Networking Integration

The two-dimensional barcode system 100 may be used to update, or add information to, websites, for example, but not limited to, adding "Like/Don't like" records to the customer's page on the Facebook and Twitter or a Operator/broadcaster's social network/application.

The subscriber presses a button (on the remote control) to vote for a show. The STB 112 generates a 2D barcode 126 with the voting selection. The scanned data is sent to the operator/broadcaster's Headend 114 via the Internet enabled device 120. The Headend 114 could store some form of an access token for the third-party social media site, like Facebook. The Operator/broadcaster's Headend 114 verifies the subscriber's identity and delivers the user's voting data along with the access token to the social media site. This type of usage pushes the problem of interacting with third-parties from the STB 112 to the application running in the Headend 114 so that there is no need to manage passwords in the STB 112 for the third party website. This method requires the user to allow operator/broadcaster's Headend 114 to act as a user's proxy for accessing the third-party site.

It will be appreciated that many of the features of the system 100 may be implemented, individually or in any suitable combination, within the system two-dimensional barcode system 10 of FIG. 1.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. An end-user device, comprising:
  a receiver to receive a data stream including video data from a Headend, the video data including at least one service, wherein a user of the end-user device is a subscriber of the at least one service;
  a decoder to decode the video data of the at least one service; and a processor to:
   receive a request from the subscriber to purchase a new pay-per-view item;
   check whether the subscriber is permitted to purchase the new pay-per-view item;
   prepare barcode-input data including:
      (a) at least one of: an identification of the user of the end-user device; and an identification of the end-user device;
      (b) data based on activity of at least one of: the end-user device; the user of the end-user device; and a security element removably inserted into the end-user device; and
      (c) if the subscriber is not permitted to purchase the new pay-per-view item, a purchase history of pay-per-view items purchased by the subscriber;
   prepare a two-dimensional barcode including the barcode input data, the two-dimension barcode being prepared for displaying on a display in a manner suitable for scanning by a communication device; and
   receive a message from the Headend allowing further pay-per-view purchases.

2. The device according to claim 1, further comprising:
a smart card interface for receiving a smart card of the subscriber therein, the smart card including a smart card identification, the identification of the subscriber including the smart card identification, the smart card including the security element.

3. The device according to claim 2, wherein the smart card is operative to compute a plurality of control words to decrypt the video data of the at least one service.

4. The device according to claim 1, wherein the processor is operative to:
   retrieve a pay-per-view identification of a pay-per-view item from a future entitlement control message;
   prepare the barcode input data for the two-dimensional barcode to include the pay-per-view identification of the pay-per-view item ordered by the subscriber; and
   receive an entitlement management message from the Headend authorizing viewing of the pay-per-view item.

5. The device according to claim 1, wherein:
   the receiver is operative to receive, from the Headend, a renewal entitlement management message renewing entitlement to consume the at least one service; and then
   the processor is operative to prepare the barcode input data for the two-dimensional barcode to include a confirmation confirming successful receipt of the renewal entitlement management message.

6. The device according to claim 1, wherein:
   the processor is operative to prepare the barcode input data for the two-dimensional barcode to include a request to renew entitlement to the at least one service; and then
   the receiver is operative to receive, from the Headend, a renewal entitlement management message renewing entitlement to consume the at least one service.

7. The device according to claim 6, wherein the processor is operative create the request to renew entitlement at randomly timed intervals.

8. The device according to claim 6, wherein the processor is operative to prepare additional barcode input data for another two-dimensional barcode to include a confirmation confirming successful receipt of the renewal entitlement management message.

9. The device according to claim 1, wherein the identification of the user includes a public key of the user.

10. The device according to claim 1, further comprising a chip having a chip identification, the identification of the end-user device including at least one of the chip identification and a serial number of the end-user device.

11. The device according to claim 1, wherein the processor is operative to prepare the barcode input data for the two-dimensional barcode to include details of a technical problem with the end-user device or a technical problem with software running on the end-user device.

12. The device according to claim 1, wherein the processor is operative to prepare the barcode input data for the two-dimensional barcode to include details of a loss of service authorizations.

13. The device according to claim 1, further comprising:
a receiver to receive a data stream which includes an item code of an item for sale, wherein the processor is operative to: prepare the barcode input data for the two-dimensional barcode to include the item code; and prepare the two-dimensional barcode to also include a digital signature of at least part of the barcode input data.

14. The device according to claim 13, wherein the processor is operative to create the digital signature by digitally signing at least the item code and the identification of the user.

15. The device according to claim 13, wherein the processor is operative to receive the digital signature signed by a smart card removably inserted into the end-user device, the digital signature authenticating the item code and the identification of the user.

16. The device according to claim 1, wherein the data stream includes an Internet address of an Internet site where the item for sale is being advertised.

17. The device according to claim 1, wherein the processor is operative to:
   receive a vote from the user, the vote being selected by the user from a choice of candidates; and
   the processor is operative to prepare the barcode input data for the two-dimensional barcode to include the vote.

18. A method comprising:
   receiving a data stream including video data from a Headend, the video data including at least one service, wherein a user of an end-user device is a subscriber of the at least one service;
   decoding the video data of the at least one service,
   receiving a request from a subscriber to purchase a new pay-per-view item;
   checking whether the subscriber is permitted to purchase the new pay-per-view item;
   preparing barcode-input data including:
      (a) at least one of: an identification of the user of the end-user device; and an identification of the end-user device;
      (b) data based on activity of at least one of: the end-user device; the user of the end-user device; and a security element removably inserted into the end-user device; and
      (c) if the subscriber is not permitted to purchase the new pay-per-view item, a purchase history of pay-per-view items purchased by the subscriber;
   preparing a two-dimensional barcode including the barcode input data, the two-dimension barcode being prepared for displaying on a display in a manner suitable for scanning by a communication device; and
   receiving a message from the Headend allowing further pay-per-view purchases.

* * * * *